Oct. 6, 1942.     H. J. EKLUND     2,298,203
RIVET
Filed April 2, 1941

Inventor
Howard J. Eklund
BY
Parker, Carlson, Pitzner & Hubbard
Attorneys.

Patented Oct. 6, 1942

2,298,203

UNITED STATES PATENT OFFICE 2,298,203

RIVET

Howard J. Eklund, Chicago, Ill., assignor to Rolyan Corporation, Chicago, Ill., a corporation of Illinois Application April 2, 1941, Serial No. 386,397

8 Claims. (Cl. 85—37)

The invention relates generally to rivets and more particularly to the type of rivet which may be set in the parts being riveted where such parts are accessible at only one side.

The general object of the invention is to provide a novel rivet of the foregoing type comprising a plurality of parts which are locked together as an incident to setting the rivet, the parts being so constructed as to require a minimum shift of the metal to effect such locking.

More specifically, it is an object to provide a novel rivet of the type set forth, which comprises a tubular member and a pin provided with grooves for receiving metal upset from the tubular member, and in which the tubular member is provided with a portion so located and shaped as to reduce to a minimum the amount of metal shifted in the upsetting operation and the effort required to cause such upsetting.

Another object is to provide a novel rivet of the type set forth, which avoids the necessity of excessively large forces to set and to lock the parts thereof together.

A further object is to provide a novel rivet of the type set forth, which is adapted to be set and locked by a pulling operation of only moderate force.

It is also an object to provide a novel rivet of the type set forth which comprises a tubular member enclosing a pin, and a ring adapted to be expanded over the tubular member by forces applied to the pin and tubular member at the opposite side of the structure being riveted, the forces being directed solely axially of the parts to avoid placing any torque on the parts against which they must be held, whereby the tublular member may be provided with a head of rounded form such, for example, as is used on an ordinary rivet, in place of a form such as square or hexagonal.

Other objects and advantages will become apparent from the following description taken in connection with the accompanying drawing, in which.

Figure 1:
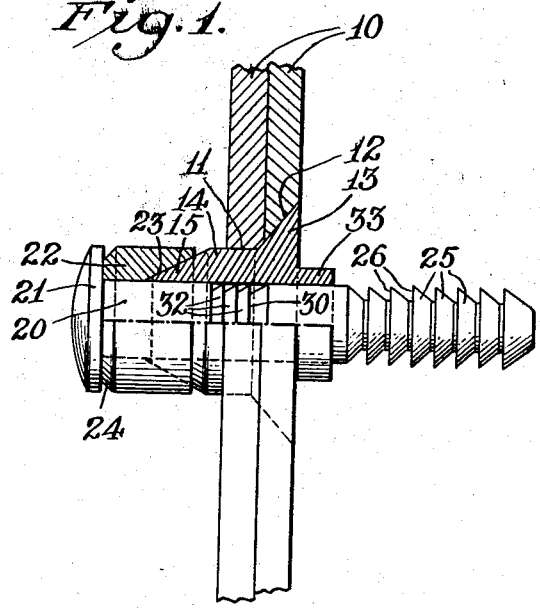
Figure 1 is a view partially in section showing a rivet embodying the features of the invention, with the rivet placed in the structure to be riveted preparatory to performing the riveting operation.

As mentioned above, a rivet embodying the features of the invention is of the type which may be inserted in the structure that is to be riveted from one side thereof, and the rivet set by an operation performed at said one side only. Thus the rivet is particularly desirable for use on such structures as tanks or other enclosures where only one side of the structure is readily accessible.

The rivet is designed so that a minimum force is employed to effect setting of the rivet in the structure and to cause the parts of the rivet to be interlocked. The rivet is also designed so that at the side of the structure which is accessible, the rivet will have substantially the same appearance as an ordinary rivet, that is, the head of the rivet may be of standard shapes such as button head or countersunk.

The rivet in its preferred form comprises, generally, a tubular member adapted to be inserted into the structure to be riveted from one side thereof, the tubular member extending beyond the opposite or inaccessible side. Enclosed within the tubular member is a pin extending beyond the tubular member at the inaccessible side of the structure and provided with a head thereon. Interposed between said head and tubular member is a ring which is adapted to be expanded over the tubular member and to abut against the structure, thus holding the rivet set. At the front or accessible side of the structure, the tubular member is provided with a head, and the tubular member and pin are forced into interlocking relation with each other so that when the rivet is set, not only are the tubular member and pin rigidly held together but they are also rigidly held in the structure. To effect the interlocking relation between the pin and tubular member, the former is provided with recesses within the head of the tubular member to receive metal upset from said head.

To minimize the force required for the upsetting of such metal, I provide excess metal on the head of the tubular member in the form of a collar surrounding the pin so that the force applied to the tubular member, in order to effect the upsetting, is exerted on the collar. Such force causes the metal of the collar to be forced into the head proper and thus displaces metal from the head causing it to be upset into interlocking relation with the pin. By means of such structure, the bulk of the metal in the head is left undisturbed so that a minimum of force is required to effect the interlocking relationship.

In the drawing, for purposes of illustration, the structure to be riveted is shown as a pair of plates 10. Assuming that the plates 10 comprise part of a structure that is readily accessible only at the right side as shown in the various figures in the drawing, the rivet must be inserted into the plates 10 from the right side thereof and the setting operation performed entirely at said side.

Figure 2:
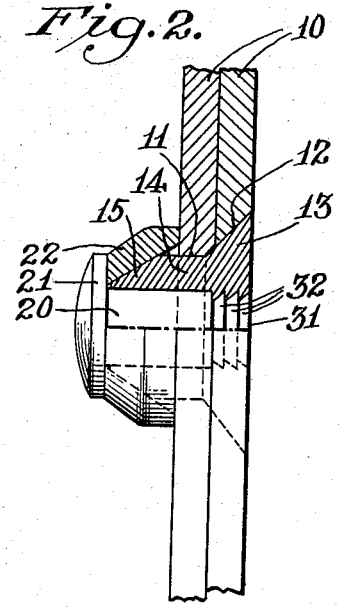
Fig. 2 is a view similar to Fig. 1 but showing the rivet after it has been set and the parts thereof locked.

The rivet shown in Figs. 1 and 2 is shaped to present substantially the appearance of a standard countersunk rivet. Thus there is an aperture 11 through the plates to receive the rivet, and this aperture is countersunk as at 12 to receive the head of the rivet. As disclosed in these two figures, the rivet comprises a tubular member having a countersunk head 13 and a substantially straight cylindrical portion 14 extending through the aperture 11. The cylindrical portion 14 of the tubular member extends beyond the opposite face of the plates and is provided with a tapered end 15.

Enclosed within the tubular member is pin 20, the shank of which extends beyond the tubular member at both ends thereof. At the inner or inaccessible side of plates 10, the pin 20 is provided with a head 21 which is of not greater diameter than the diameter of the cylindrical portion 14 of the tubular member so that the head of the pin may readily pass through the aperture 11 in the plates.

The structure which holds the rivet in place comprises a ring 22 which, prior to setting, is generally cylindrical in form and preferably of the same outside diameter as the diameter of the cylindrical portion 14 of the tubular member and the head 21 of the pin. The ring 22 is provided with an internally tapered surface 23 abutting the tapered end portion 15 of the tubular member. The other end of the ring 22 has its outer corner beveled as at 24 so that that end of the ring bears against the head 21 at a point closely adjacent the shank portion of the pin 20.

The rivet is adapted to be set by moving the pin 20 axially through the tubular member and toward the front or accessible face of the plates 10. By virtue of such movement of the pin, the tapered abutting surfaces of the ring and tubular member cause the ring to be expanded into the form shown in Fig. 2 so that the ring is spread to a greater diameter than the aperture 11 in the plates 10 and is brought into abutment with the rear face thereof. Thus the ring and pin are set by being held against movement back through the plates 10.

The pin 20 is adapted to be moved axially preferably by a force exerted on the front or projecting end thereof, which force is an axially directed pull. Such force avoids placing any torque either on the pin or on the tubular member so that the head 13 may be of generally rounded form instead of a form such as hexagonal or square. To this end, the front or projecting end of the pin is provided with a series of annular grooves 25 providing a plurality of rearwardly facing shoulders 26. To exert the pull on the pin, a gripping device (not shown) is provided which interfits with the grooves 25. By the same operation, the tubular member is held against movement by the reactionary force arising as an incident to the pulling operation. Thus the pin may be moved axially while the tubular member is held in place so that the ring 22 will be expanded as above described.

The pin 20 is constructed so that it may be shortened sufficiently to locate its end flush with the head 13 of the tubular member when the rivet is set. Thus, a groove 30 is provided in the pin so that the extending portion of the pin may be detached from that portion of the pin remaining in the tubular member after the setting operation has taken place. With the groove 30, the extending end of the pin which has the grooves 25 may be either broken or sawed off leaving a surface 31 (see Fig. 2) substantially flush with the head 13 of the tubular member.

The tubular member and pin are also shaped so that they are interlocked to each other upon completion of the setting operation not only to retain the tubular member within the plates but also so that tension set up in the parts will be retained therein to hold all parts rigidly in place. To this end the pin is recessed in that part which is located adjacent the head of the tubular member after the setting operation has taken place, the recessed portion of the pin being adapted to receive metal upset from the head of the tubular member to rigidly lock the two together. Thus I provide a plurality of grooves 32 adjacent the groove 30 so that they are located within the head 13 of the tubular member when the rivet is set as shown in Fig. 2.

Metal from the head 13 is adapted to be upset into the grooves 32 after the ring 22 has been expanded to set the rivet. If the head 13 were of substantially the same shape before such upsetting operation as after the upsetting operation, the whole head 13 would have to be upset, that is, the metal throughout the head would have to be disturbed in order to provide metal to fill the grooves 32. Obviously to disturb the metal throughout the head 13 would require considerable force. To avoid having to exert a force sufficient to reform the entire head of the tubular member, I provide excess metal extending from the head 13 and so located as to readily supplant the metal forced into the grooves 32. Thus this excess metal is forced back into the head causing the metal closely adjacent the grooves 32 to be forced therein, thereby avoiding the necessity of disturbing the major portion of the metal in the head 13.

In the preferred form, the excess metal is provided by a collar 33 integral with the head 13 and extending therefrom closely adjacent the pin 20. The quantity of metal in the collar 13 is substantially equal to the amount of metal required to fill the grooves 32 in the pin. In exerting a pulling force on the pin 20, the reactionary force thereby set up is applied to the collar 33 by an anvil or the like (not shown). In the operation of setting and locking the rivet, less force is required to expand the ring 22 than is required to upset the collar 33. When a pull is exerted on the pin 20, the ring 22 is first expanded until it is forced into the position as shown in Fig. 2. Thereafter the tension exerted on the pin 20 causes a reactionary force against the collar 33 of sufficient magnitude to cause the metal of the collar to be forced into the head 13. Since the grooves 32 in the pin 20 at such time are located within the thickness of the head 13, the upsetting of the collar 33 causes the metal of the head 13 adjacent the grooves to flow into the grooves, such metal being replaced by the metal of the collar 33. Thus the upsetting operation causes a disturbance and shifting of only that part of the head which is adjacent the pin, while the outlying portions of the head 13 are left substantially undisturbed. Moreover the ultimate shape of the head 13 is that of the usual countersunk form of head.

Figure 3:
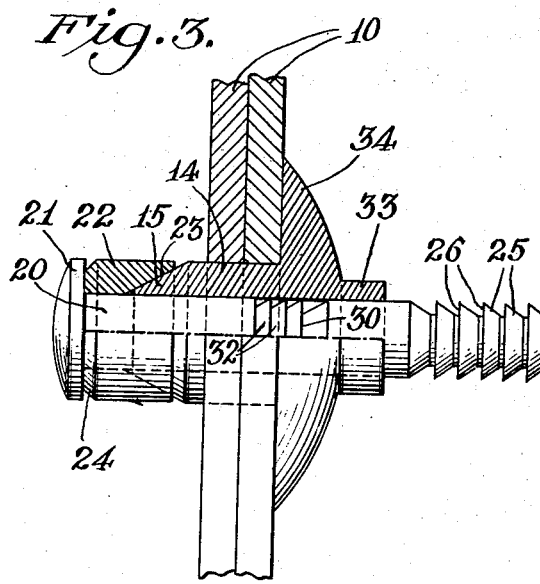
Fig. 3 is a view similar to Fig. 1 but showing a somewhat different type of rivet.
Figure 4:
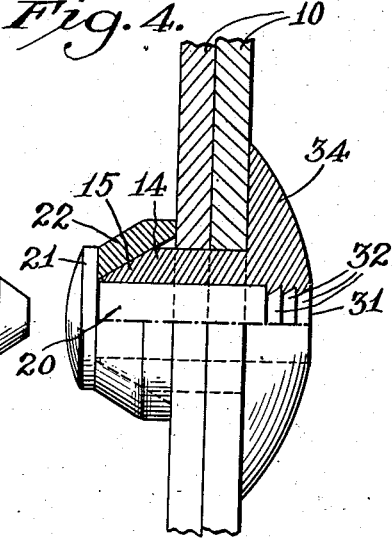
Fig. 4 is a view similar to Fig. 3 but showing the rivet after it has been set and the parts thereof locked.

In Figs. 3 and 4 I have shown a rivet of the same construction except that the head of the tubular member, here indicated at 34, is of the customary button head form. Since the head 34 lies above or beyond the face of the plates 10, the length of the pin between its head 21 and the point 31 at which it is broken or sawed is longer and the grooves 32 in this instance are located within the thickness of the head 34 but beyond the front face of the plates 10. The collar 33 extends from the outer face of the head 34 but is utilized in the same manner as the collar shown in Figs. 1 and 2. Thus the head 34, after the setting and locking operation is completed, has substantially the form of a button head rivet of standard construction.

From the foregoing description it will be apparent that I have provided a novel rivet of the type that may be inserted and set from one side of the structure to be riveted, which rivet comprises a plurality of parts locked together as an incident to the setting of the rivet. Such setting and locking of the parts requires a minimum shift of the metal, thereby minimizing the forces to effect such setting and locking. In other words, I have provided a novel rivet of the type set forth in which the tubular member is provided with an integral portion adapted to supplant the metal which is forced into locking relation with the pin so that a major portion of the tubular member is left undisturbed and consequently a minimum force is required. It will also be apparent that I have provided a novel rivet of this type which is adapted to be locked and set by a pulling operation of only moderate force. The pulling operation exerts no torque on either the pin or the tubular member so that the head of the tubular member need not be made in such out-of-round form that it may be held against rotation, but may be of generally rounded form, such, for example, as is used on an ordinary rivet.

I claim as my invention:

1. A rivet comprising, in combination, a tubular member adapted to extend through the structure to be riveted, a pin extending through said member and having a head on one end located beyond the tubular member, a ring mounted on said pin between said head and said tubular member and adapted to be expanded over the adjacent end of the tubular member when the pin is pulled to set the rivet, said pin having a recessed portion adjacent the other end of the tubular member, and a collar integral with said other end of the tubular member and closely surrounding said pin, said collar being adapted to be upset into said tubular member by the reactionary force arising upon setting of the rivet and thereby forcing metal into the recessed portion of the pin in interlocking relation without materially altering the shape of the tubular member whereby a minimum of force is required to effect such interlocking relation.

2. A rivet comprising, in combination, a tubular member adapted to extend through the structure to be riveted, a pin extending through said member, said member and said pin being provided with means at one side of the structure for setting the rivet when the pin is pulled from the other side and the reactionary force is applied to the tubular member at said other side, said pin being provided with a recessed portion adjacent said other side, and said tubular member having an integral collar at said other side adapted to be upset into the tubular member to force metal into the recessed portion of the pin with a minimum shifting of the metal of the tubular member.

3. A rivet comprising, in combination, a tubular member adapted to extend through the structure to be riveted, a pin extending through said member, said member and said pin being provided at one side of the structure with means for setting the rivet when the pin is moved toward the other side and a force is applied to the tubular member at the other side, said pin being provided with a portion adjacent said other side to receive metal upset from the tubular member to lock said pin and member together, said tubular member having an integral extension at said other side adjacent the pin and adapted to be upset into the tubular member proper to force metal into said portion of the pin with a minimum shifting of the metal of the tubular member.

4. A rivet comprising, in combination, a tubular member having a head adapted to abut one side of the structure to be riveted, said tubular member extending through said structure, a pin extending through said tubular member, said member and said pin being provided at the other side of the structure with means for setting the rivet when the pin is moved axially relative to the tubular member, said pin being provided with a portion adjacent said one side to receive metal upset from the head of the tubular member to lock said pin and member together, said head having an integral collar surrounding the pin and adapted to be upset into said head to force metal into said portion of the pin with a minimum shifting of the metal of the head.

5. A rivet comprising, in combination, a tubular member and a pin extending therethrough adapted to be inserted into the structure to be riveted from one side thereof, and provided with means at the other side of said structure for setting the rivet by forces applied to the tubular member and pin at said one side of the structure, said pin being provided with a recessed portion adjacent said one side to receive metal upset from the tubular member to lock said pin and member together after the rivet is set, said tubular member having an integral extension at said one side closely adjacent the pin and adapted to be upset into the tubular member proper to force metal into said recessed portion of the pin with a minimum shifting of the metal of the tubular member.

6. A rivet comprising, in combination, a tubular member and a pin extending therethrough adapted to be inserted into the structure to be riveted from one side thereof, and provided with means at the other side of said structure for setting the rivet by force applied to the tubular member and pin at said one side of the structure, said pin being provided with a peripherally recessed portion adjacent said one side to receive metal upset from the adjacent portion of the tubular member to lock said pin and member together, said tubular member having an integral collar extending beyond said adjacent portion and adapted to be upset into the tubular member proper to force the metal of said adjacent portion into the recessed portion of the pin without disturbing the major part of the metal of the tubular member.

7. A rivet comprising, in combination, a tubular member and a pin extending therethrough adapted to be inserted into the structure to be riveted from one side thereof, and provided with means at the other side of said structure for setting the rivet by force applied to the tubular member and pin at said one side of the structure, said pin being shaped adjacent said one side to interlock with metal upset from the adjacent portion of the tubular member, said tubular member having an integral extension adjacent the portion to be upset and adapted to be upset into the tubular member proper to force the metal of said adjacent portion into interlocking relation with the pin without disturbing the major part of the metal of the tubular member.

8. A rivet comprising, in combination, a tubular member having a head adapted to abut one side of the structure to be riveted, and a pin extending through the tubular member, said member and pin being adapted to be inserted into the structure from said one side and being provided with means at the other side of said structure for setting the rivet by forces applied to the tubular member and pin at said one side of the structure, said pin being provided with a plurality of annular grooves located within the thickness of said head when the rivet is set, said head having a collar surrounding the pin and extending beyond the head, said collar being adapted to be upset into the head and thereby cause a flow of metal from the head into the grooves into interlocking relation therewith whereby a major portion of the head is left undisturbed by the upsetting operation.

HOWARD J. EKLUND.